(12) United States Patent
Mayer et al.

(10) Patent No.: US 9,012,827 B2
(45) Date of Patent: Apr. 21, 2015

(54) OPTOELECTRONIC MEASURING SYSTEM WITH A COMPENSATION LIGHT SOURCE

(71) Applicant: Mechaless Systems GmbH, Bruchsal (DE)

(72) Inventors: Bernd Mayer, Ellwangen (DE); Egbert Spiegel, Gelsenkirchen (DE)

(73) Assignee: Mechaless Systems GmbH, Bruchsal (DE)

( * ) Notice: Subject to any disclaimer, the term of this patent is extended or adjusted under 35 U.S.C. 154(b) by 349 days.

(21) Appl. No.: 13/708,041

(22) Filed: Dec. 7, 2012

(65) Prior Publication Data

US 2013/0092815 A1  Apr. 18, 2013

Related U.S. Application Data

(63) Continuation of application No. PCT/EP2011/058428, filed on May 24, 2011.

(30) Foreign Application Priority Data

Jul. 6, 2010 (EP) .................................... 10168569

(51) Int. Cl.
*G01J 1/20* (2006.01)
*G01J 1/44* (2006.01)
(Continued)

(52) U.S. Cl.
CPC . *G01J 1/44* (2013.01); *G01S 7/497* (2013.01); *G01S 17/026* (2013.01); *G01S 17/936* (2013.01)

(58) Field of Classification Search
USPC ....................................................... 250/201.1
See application file for complete search history.

(56) References Cited

U.S. PATENT DOCUMENTS

| 5,666,037 A | 9/1997 | Reime |
| 7,589,303 B2 | 9/2009 | Reime et al. |

(Continued)

FOREIGN PATENT DOCUMENTS

| DE | 102 11 307 A1 | 11/2003 |
| DE | 103 00 223 B3 | 6/2004 |

(Continued)

OTHER PUBLICATIONS

International Patent Application PCT/EP2011/058428 English-language Translation of International Preliminary Report on Patentability mailed Jan. 17, 2013.

(Continued)

*Primary Examiner* — Thanh Luu
*Assistant Examiner* — Renne D Chavez
(74) *Attorney, Agent, or Firm* — Woodard, Emhardt, Moriarty, McNett & Henry LLP

(57) ABSTRACT

An optoelectronic measuring system comprises at least two transmission light sources that emit time-sequentially clocked, phased light. A compensation light source is controlled independently of the transmission light sources. A receiver receives the light radiated by the transmission light sources, and the compensation light source converts them into an electrical received signal. At least two evaluation units evaluate the received signal and generate one control signal each. At least two transmission paths each comprise a transmission light source, an evaluation unit and a clock generator. The clock generator generates the clock for the transmission light sources and for the evaluation unit. The evaluation units each generate a control signal. A control unit generates a compensation control signal from the control signals, with which the compensation light source is controlled and supplied. The evaluation unit generates a clock-synchronous control signal for the transmission light source from the received signal.

14 Claims, 4 Drawing Sheets

(51) Int. Cl.
*G01S 7/497* (2006.01)
*G01S 17/02* (2006.01)
*G01S 17/93* (2006.01)

(56) References Cited

U.S. PATENT DOCUMENTS

2005/0092900 A1 5/2005 Reime et al.
2007/0221824 A1 9/2007 Melcher et al.

FOREIGN PATENT DOCUMENTS

| | | |
|---|---|---|
| DE | 10 2004 025 345 B3 | 11/2005 |
| EP | 0 706 648 B1 | 4/1996 |
| EP | 1 671 160 B1 | 5/2007 |
| WO | WO 2004/061639 A1 | 7/2004 |

OTHER PUBLICATIONS

International Patent Application PCT/EP2011/058428 English-language Translation of International Search Report mailed Sep. 5, 2011.

OPTOELECTRONIC MEASURING SYSTEM WITH A COMPENSATION LIGHT SOURCE

CROSS-REFERENCE TO RELATED APPLICATION

This application is a continuation of International Application No. PCT/EP2011/058428 filed May 24, 2011, which claims the benefit of European Patent Application No. 10168569.1 filed Jul. 6, 2010, which are both hereby incorporated by reference in their entirety.

BACKGROUND

The present invention relates to an optoelectronic measuring system comprising at least two transmission light sources, a compensation light source, a receiver for receiving the light radiated by the transmission light sources and the compensation light source and for converting received light signal into an electrical receiving signal, and a control and evaluation unit. The generation of a compensation control signal to control the compensation light source serves to compensate for scattering light, so that a measurement of light reflected by an object that is conducted to detect the object can be completed without the need to consider scattering light.

Optical measuring systems with scattering light compensation are known for example from EP 0 706 648 B1, which describes an optical system for detecting a change in the reflection from an object. With this system, measurements can be taken in the presence of scattering light and changes in the scattering light or ambient light do not affect the measurement value. Such a system is described using the example of a windshield wiper sensor, with which raindrops falling on the windshield are detected. Systems of such kind may also serve as the basis for creating other optical measuring arrangements for evaluating optical couples. Examples of this are reflection light barriers or transmitted light barriers.

Such a measuring system comprises two measurement paths, each of which includes a transmission light source and a shared receiver. One of the two initially equivalent transmission light sources will hereafter also be designated the compensation light source. Each measurement path has an optical couple that is derived from the ratio of received to transmitted energy. While both light sources emit radiation, particularly light, in the visible and invisible ranges, the receiver detects the light and radiation coupled via both measurement paths that are reflected by objects or other surfaces or are transmitted by the respective media in the measurement paths. A measurement signal that is independent of the influences of ambient light and other interference factors acting on the receiver may be obtained by comparing the two measurement paths.

The measurement arrangement comprising the two transmission light sources and the receiver is operated via the associated control and evaluation unit in such manner that the transmission light sources transmit alternatingly at the frequency of a shared clock generator. The light components of both transmission light sources modulated in this manner are then contained in the receiving signal, weighted by the coupling factors of the respective measurement paths. The evaluation unit demodulates the received signal again into the two signal components assigned to the measurement paths synchronously with the clock generator. The difference between the two signal components is now balanced to zero using a compensation measuring method by adjusting the amplitude of the control signals from the transmission light sources. In the compensated, that is to say the adjusted state, the quantity of radiation received is the same for both measurement paths, and the clock-synchronous alternating component is thus also zero. The ratio between the control signals for the two transmitted light sources forms the actual useful signal of the measuring device.

It is known from the related art that if considerably more than two measurement paths are needed, another transmission light source must be installed for each measurement path. The measuring arrangement is then evaluated in a sequential multiplex mode, so that exactly two measurement paths can be adjusted with respect to one another in a series of consecutive operations. However, as more and more measurement paths are needed, processing cycles also become longer and longer, slowing down the measuring system.

The system described in EP 0 706 648 B1 with an analog adjustment system is enhanced in EP 1 671 160 B1 and adapted for a digital system to create a technically simpler apparatus and achieve a high degree of sensitivity.

In DE 103 00 223 B3, a compensation light source is used as well as the transmission light sources. Only the compensation light source is adjusted, whereas the transmission light source used to monitor an optical measurement path is either not adjusted or is controlled by considerably simpler means.

SUMMARY

The problem raised by the related art is that it is not possible to carry out simultaneous measurement in measurement systems with a large number of optical measurement paths. The object of the present invention is therefore to create an optical measuring system that enables simultaneous evaluation of multiple measurement paths with a high degree of sensitivity yet which is still as inexpensive as possible and functions efficiently.

The present object is solved with an optoelectronic measuring system having the features of claim 1 and with a method having the features of claim 10.

The optoelectronic measuring arrangement or system according to the invention comprises at least two transmission light sources that emit light in a chronologically sequentially clocked manner and in phases, a compensation light source that also emits light, a receiver unit with a receiver, at least two evaluation units, at least two measurement paths, each of which comprises a transmission light source, an evaluation unit and a clock generator, and a control unit.

Accordingly, the optoelectronic measuring system has at least three light sources, wherein the compensation light source is a light source with an adapted optical coupling to the receiver and is controlled independently of the other light sources. Usually, the optical pathway between the compensation light source and the receiver is not used to detect objects. The optical paths that are formed between one of the other at least two transmission light sources and the receiver are used for this purpose.

The receiver serves to receive the light radiated by the transmission light sources and by the compensation light source. In the receiver, an electrical received signal that is proportional to the light signal from all transmission light sources is generated from the received light signal. The alternating light component thereof is received in particular. The light radiated from the light sources may be visible light or invisible light, such as infrared light or electromagnetic radiation in the invisible frequency range, such as radar radiation for example.

The receiver element also receives light from the environment. This may be natural ambient light and/or artificial (man-made) extraneous light or artificial ambient light. The signal is limited to the frequency bandwidth used by the transmission light sources with the aid of suitable filters. After suitable amplification, this signal is present at the amplifier output as the received signal.

From the received signal, the at least two evaluation units each generate a control signal for the associated transmission light source and for the compensation light source, which is preferably shared by the evaluation units.

The measuring arrangement according to the invention comprises at least two measurement paths. Each measurement path comprises at least one transmission light source with an optical path, which is used by sensors, to the receiver, an evaluation unit and a clock generator, which is preferably located in the evaluation unit. The receiver and the compensation light source are preferably actuated simultaneously for all measurement paths.

The clock generator generates a clock for controlling the respective measurement path. In this way, each transmission light source and each evaluation unit is served by a dedicated clock generator. The essential point is that the transmission light source and the evaluation unit for a measurement path are served by the same clock generator.

The receiving signal includes the emitted light from all transmission light sources and the compensation light source. In the evaluation unit of the respective measurement path, only the clock-synchronous component from the clock generator for the associated measurement path is demodulated from the receiving signal. Accordingly, the control signal is only based on the component of the receiving signal that was generated by the transmission light source of the measurement path and the compensation light source.

The control unit generates a compensation control signal from the control signals of all the measurement paths. Therefore, it is also designated the compensation control unit. Thereby, the control signals are generated by the evaluation units for the measurement paths. The compensation control signal controls and feeds the compensation light source. An amplifier or current drive unit may optionally be located between the control unit and the compensation light source to modify or amplify the compensation control signal.

Since the receiver with its signal processing capability and the compensation light source are used together, further optical measurement paths can be added in the optoelectronic measuring arrangement according to the invention with little effort. All that has to be done is to add a new measurement path comprising a transmission light source, and an evaluation unit and a clock generator. These components are inexpensive and can be easily integrated in an existing measuring arrangement.

Until now, it was assumed in the related art that in order to compensate for the effects of interfering light in the measurement path, a direct assignment must be made between the compensation signal and the signal from the transmission light source. This is why, when a plurality of transmission light sources was used, the signals were processed sequentially or the light was transmitted sequentially by the individual transmission light sources. However, this results in long processing cycles and slow measuring systems. The remedy of using high switching frequencies between the individual measurement paths merely results in more measurement noise, which interferes with the evaluation of the measurement paths.

Even when fewer, highly sensitive measurement paths are used, for example for detecting objects at distances of a few meters, for which only low optical couplings can be achieved, it is often not possible to evaluate the measurement paths quickly enough with one receiver in sequential multiplex mode. On the other hand, in most cases the optics used do not allow an equivalent arrangement of a plurality of receivers for measuring arrangements working in completely parallel mode.

It was then discovered in the context of the invention that the compensation light signal, which is transmitted by the compensation light source, may also be used to compensate a plurality of preferably different light signals from a plurality of transmission light sources. Since an adjusted zero signal without clock-synchronous alternating light components is generated at the receiver for each measurement path as described above, the individual measurement paths do not interfere with each other even in simultaneous operation. At the same time, it is important that the modulation frequency (the frequency of the clock generator) is different and/or that a different modulation schema is used for each measurement path. If quadrature modulation is used, two measurement paths may be operated on a single (the same) frequency. For this, the two carrier signals are phase-locked with a phase shift of 90 degrees and subsequently separated by coherent demodulation. In this way, it is possible to make better use of the available signal bandwidth of the receiver. If different modulation frequencies are used, such frequencies, the clock frequencies of the individual clock generators, must be for example sufficiently different from each other to allow the corresponding light signal originating from the transmitted light source of the transmission path to be separated in the individual evaluation units for the various measurement paths of the measuring arrangement. The signal component belonging to the respective transmission path is filtered out of the electrical receiving signal, because in synchronous demodulation (also called coherent demodulation) only the frequency of the respective transmission path is considered. This is also achieved by controlling the transmission light source and the evaluation unit with the same clock generator and feeding them with the same clock frequency.

Because of the bandpass effect created by the demodulation performed in the evaluation unit, which preferably functions according to the lock-in method, relatively small frequency separations, for instance from 0.1% to 10% of the clock frequency, are sufficient for simple frequency modulation. Consequently, the clock frequencies of the clock generators for controlling the individual transmission light sources must be sufficiently different from each other to enable them to be separated again during demodulation. The frequency difference between two clock frequencies is at least 1 kHz.

In a preferred embodiment, the clock frequencies generated by the clock generators for controlling the transmission light sources are at least 20 kHz. This means that the supply frequency is also at least 20 kHz.

It has proven to be advantageous that the clock frequencies of each of two clock generators are no whole-number multiples of one another. This considerably improves the effectiveness of the entire measuring arrangement.

In a preferred embodiment, the control unit for controlling the compensation light source is an adder. With this, the measuring arrangement can be designed simply and inexpensively. In the adder, the inverted control signals from the individual transmission paths are merged and a corresponding compensation control signal is generated. The compensation control signal then includes the frequency components of the control signals from the individual evaluation units. Of course it is also possible to use two or more compensation light sources.

One advantage of the optoelectronic measuring arrangement according to the invention is that it makes it possible to simultaneously evaluate the individual measurement paths, that is to say the light signals emitted by the individual transmission light paths. The number of transmission light sources may thus be significantly increased for the same number of receiver units and the same measurement value capture rate. For example, 10, 20, 50, 70 or 100 transmission light sources may be used, and only one receiver is required. In this way, for example, light strips may be formed to carry out admission control through doors or other passageways. At the same time, many transmission light sources may be positioned close to each other along sections several meters long so that a closely meshed monitoring grid can be formed.

The invention is characterized in that some resources of an optical sensor may be shared. On the one hand, only one compensation light source has to be used to simultaneously compensate for the light signals emitted from a plurality of transmission light sources. In addition, the receiver and an optional receiver amplifier may also be shared. Other components that may be allocated to receiver unit, such as filters (low pass, high pass, band pass) may be shared. It is precisely the receiver and the preamplifier it usually includes that are the costly components.

When measuring arrangements or sensor systems are implemented it is often not possible to position and install an unlimited number of these components due to the constraints of the circuitry and local conditions.

The efficient use of individual (expensive) components thus results in an inexpensive measuring arrangement. It is true that multiple evaluation units and clock generators are included in the measuring arrangement according to the invention. Each transmission path has its own evaluation unit and clock generator. But these components are available inexpensively in the form of electronic components. For example, they may be integrated in an IC or ASIC, so that the duplication of these components does not lead to a significant increase in cost.

Consequently, even though multiple transmission light sources are used and all transmission light sources are evaluated simultaneously using a modulation schema (preferably frequency modulation), the present invention allows working without loss of the independence of extraneous light. For this reason, such measuring arrangement may also be implemented without great expense on factory floors or in daylight rooms. The individual measurement paths or transmission paths do not have to be shielded.

For example, if a plurality of light sources is required to cover a greater expanse when constructing very large light grids, of course a plurality of measuring arrangements can also be used in combination. The measuring arrangements may then be processed and evaluated in a multiplexing operation. Often two or three of the measuring arrangements described in the preceding are sufficient, so that only two or three input variables have to be processed in the multiplexing operation, and the response time of the overall system also remains very short.

The problem described in the introduction is also solved with the method according to the invention, in which a plurality of optical transmission paths are evaluated simultaneously by means of an optoelectronic measuring arrangement with extraneous light compensation. In this context, the measuring arrangement comprises at least two transmission light sources that emit time-sequentially clocked light in phased manner, a compensation light source that is controlled independently of the transmission light sources and emits a compensation light, and a receiver to receive the light emitted by the transmission light sources and the compensation light source, particularly to receive the alternating component thereof. The receiver also receives the extraneous light and/or ambient light that prevails in the surroundings as well.

The measuring arrangement further includes at least two evaluation units, each of which is assigned to a transmission light source. The evaluation units carry out clock-synchronous evaluation of the alternating light components of the light signals received emitted by the transmission light sources and the compensation light source. A control signal is generated from the received light signal in each evaluation unit. The control unit of the measuring arrangement merges all of the control signals generated by the evaluation units to create a compensation signal.

The method according to the invention comprises the following steps:

receiving a light signal containing an alternating light component that includes light from at least two transmission light sources and a compensation light source. In a next step, the alternating light component is converted into an electrical receiving signal. The receiving signal is fed to the at least two evaluation units. The feed is preferably in parallel, and thus simultaneous. In a further step a clock-synchronous, frequency-selective evaluation of the received signal is carried out in each of the evaluation units. The evaluation is based on the modulation frequency in each case, which is set by the assigned clock generator. The two components of the transmission light source (in phase) and the compensation light source (in counterphase) are first demodulated. After the system has been adjusted, the receiving signal no longer contains any clock-synchronous alternating components relative to this modulation frequency, and consequently the two demodulated phases have the same value. However, if no adjusted transmission path is present, the result is a difference between the two demodulated signal components. This difference is then compensated to zero by a compensator, which regulates the transmission light source and the compensation light source in such manner via the corresponding control signals from the evaluation unit that the two components in the receiving signal cancel each other out exactly again.

A further step comprises feeding the control signal to the transmission light source assigned to the evaluation unit, so that the transmission light source is supplied with the same frequency as is provided to the evaluation unit for processing. The control signal or signals is/are inverted and fed to a control unit as an inverted control signal. In a further step, all inverted control signals of the evaluation units are merged to form a compensation control signal that contains the frequency components of all of the control signals. The inverted control signals are preferably merged by means of an adder. The compensation control signal is fed to the compensation light source. In order to supply the compensation light source, the compensation control signal may be amplified via a current driver or an amplifier, for example. A current driver or amplifier may also be used to amplify the control signal and transmission signal for supply to the transmission light sources.

BRIEF DESCRIPTION OF THE DRAWINGS

In the following, the invention will be explained in greater detail with reference to the particular embodiments shown in the figures. The special features shown in the figures may be implemented alone or in combination to create preferred embodiments of the invention. The embodiments described do not represent any limitation of the invention defined by the generality of the claims. In the figures:

DETAILED DESCRIPTION

Figure 1:
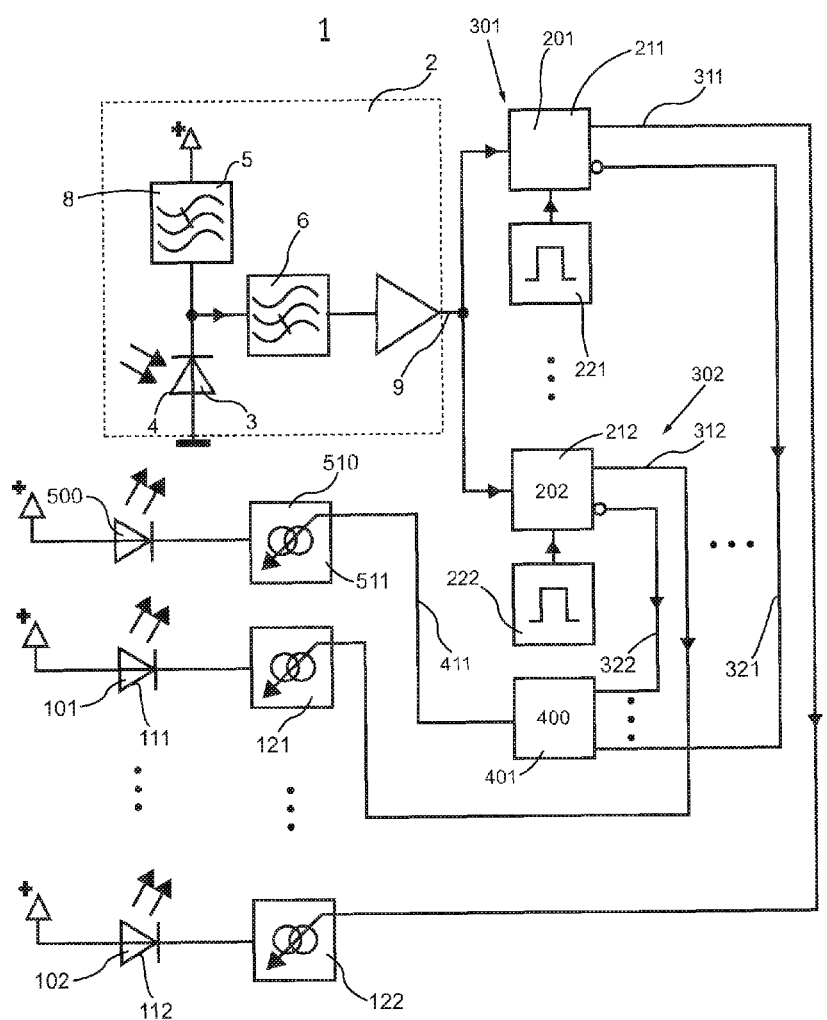
FIG. 1 shows a schematic diagram of a circuit arrangement according to the invention for simultaneous evaluation of a plurality of optical measurement paths with compensation for extraneous light.

FIG. 1 shows an optoelectronic measuring arrangement 1 for simultaneous evaluation of a plurality of optical measurement paths with extraneous light compensation. A receiver unit 2 comprises a receiver 3, which is preferably a photodiode 4 for receiving light, a photocurrent compensation device 5, a high pass filter 6 and a preamplifier 7. Photocurrent compensation device 5 may be a low pass filter 8 for example. Low-frequency signal components, which are usually byproducts of extraneous light, interference light or ambient light, are filtered out and dissipated by low pass filter 8. On the other hand, high pass filter 6 only allows extremely high frequency signals to pass and at the same time blocks low-frequency signals and common mode signals. High pass filter 6 is dimensioned such that the wanted signals of optoelectronic measuring arrangement 1 are allowed to pass. These signals are amplified in the subsequent preamplifier 7. In a simple variant of measuring arrangement 1, receiver unit 2 only comprises receiver 3, in which the light received by photodiode 4 is converted into an electrical receiving signal. The received light includes components of the light emitted by light sources of measuring arrangement 1.

In order to transmit an optical wanted signal in the form of light, measuring arrangement 1 comprises a plurality of transmission light sources 101, 102, of which two are shown. The light sources 101, 102 are preferably light emitting diodes (LED) 111, 112. Of course, other light sources are also possible. The configuration and selection of light sources is determined by the intended use of measuring arrangement 1.

The signal for controlling transmission light sources 101, 102 can optionally be amplified by an amplifier. A current driver 121, 122 may preferably be located in each path to the corresponding transmission light source 101, 102, as shown in FIG. 1. In such a manner, the amplitude of the control signal for transmission light sources 101, 102 can be adjusted.

The electrical receiving signal 9 provided by receiver unit 2 is routed in parallel to a plurality of evaluation units 201, 202. The evaluation units 201, 202 preferably have the form of demodulators 211, 212 to filter the signal component for a given, predetermined frequency out of received signal 9. To this end, each of the demodulators 211, 212 is controlled individually by a dedicated clock generator 221, 222. Demodulator 211, 212 breaks down the alternating signal that is clock-synchronous with the frequency of clock generator 221, 222 from receiving signal 9 into two signal components. These signal parts form the in-phase and in counter-phase components to clock generator 221, 222. The two components are used for the actual compensation to zero, which is preferably carried out by a compensator or controller. The controller is also a part of evaluation unit 201, 202. The output signal of the compensator is then modulated again with the frequency of clock generator 221, 222 and made available as control signal 311, 312 or as inverted control signal 321, 322 at the output from evaluation unit 201, 202.

Together with clock generators 221, 222 and transmission light sources 101, 102, evaluation units 201, 202 each form a separate transmission path 301, 302. Clock generator 221 of transmission path 301 provides both the clock for evaluation unit 201 and the clock for transmission light source 101 and the control therefor, so that transmission light source 101 can emit time-sequentially clocked light in phased manner.

Since the individual transmission paths 301, 302 are connected in parallel, receiving signal 9 is present at the inputs of (associated) evaluation units 201, 202 at the same time. In this way, the signal components transmitted by parallel-connected transmission light sources 101, 102 are processed simultaneously.

Evaluation units 201, 202 of individual transmission paths 301, 302 emit a control signal 311, 312 that is fed to transmission light sources 101, 102. At the same time, evaluation units 201, 202 emit an inverted control signal 321, 322. For this purpose, evaluation units 201, 202 are preferably equipped with an inverter for inverting control signals 311, 312. Inverted control signals 321, 322 are preferably phase-offset by 180 degrees relative to control signals 311, 312.

The inverted control signals 321, 322 are fed to a control unit 400, which is preferably an adder 401. The inverted control signals 321, 322 from the respective transmission paths 301, 302 are present at the inputs to control unit 400. Control unit 400 generates a compensation control signal 411 from inverted control signals 321, 322. Control unit 400 is preferably an adder. Accordingly, compensation control signal 411 is produced from the sum of inverted control signals 321, 322.

Compensation control signal 411 is fed to a compensation light source 500. This light source 500 is independent of transmission light sources 101, 102 and it also radiates time-sequentially clocked light in phased manner that contains the frequency components of all clock generators 221, 222. A converter unit 510 is preferably provided between control unit 400 and compensation light source 500, by means of which compensation control signal 411 may be adjusted to compensation light source 500. Converter unit 510 is preferably a voltage-controlled current driver 511 with which the current signal is generated from compensation control signal 411. Compensation control signal 411 may serve as the input value for current driver 511 in order to modify the amplitude of the control signal for the compensation light source. Consequently, as in the known method for extraneous light compensation, it is possible for the amplitudes of the signal components generated at receiver 3 to be the same size, so that they cancel one another out exactly because the receiving signal components (current component) in the receiving signal are phase-offset by 180 degrees.

The measuring arrangement 1 of FIG. 1 is thus based on the principle that a plurality of optical measurement paths are connected in parallel. In this context, an optical measurement path includes a transmission path 301, 302, a compensation light source 500 and a receiver unit 2. Use of the receiver unit 2 and compensation light source 500 is shared by all of the optical measurement paths. This has the advantage that measuring arrangement 1 as a whole is inexpensive due to the shared use of the receiver unit. It is also possible to keep its size compact, since at least some of the evaluation units 201, 202 and clock generators 221, 222 as well as the control unit 400 and current drivers 121, 122, 511 may be in the form of an integrated circuit (IC or ASIC). These components are cheap and can be made small.

One advantage of measuring arrangement 1 according to the invention over the related art consists in that when evaluating individual measurement paths it is not necessary to wait for a minimum period before the next measurement path can be activated. All measurement paths and transmission paths operate in parallel.

Due to the realization of different transmission paths 301, 302, each of which comprises a dedicated clock generator 221, 222, the individual signals from transmission light sources 101, 102 may be read out from receiving signal 9, that is to say the combined signal from all transmission light sources. The parallel arrangement and the configuration with a plurality of evaluation units 201, 202 connected in parallel results in true parallel processing, thus making absolutely simultaneous evaluation possible. Additionally, a plurality of such measuring arrangements may also be integrated in a further multiplex mode, that is to say in sequential processing of individual measuring arrangements 1. In this way, m measuring arrangements may function in multiplex mode, wherein each measuring arrangement 1 comprises n measurement paths. In this way, it is possible to create light curtains that monitor relatively large spatial areas of several meters. An arrangement combined in this way has a significant advantage over purely sequential operation in terms of time, since n measurement paths are always processed and evaluated in parallel. Typical values for n are in the range from 4 to 16, preferably between 4 and 10. Possible values are for example n=4; 5; 8 or 10.

In FIG. 1, measuring arrangement 1 is illustrated and explained using the example of two transmission paths 301, 302 that work in parallel. However, embodiments of measuring arrangement 1 are preferred in which at least five transmission paths 301 to 305, particularly preferably at least 10 transmission paths are configured. The upper limit of transmission paths connected in parallel is determined by the development effort that is acceptable in terms of the evaluation circuits that must be connected in parallel and by the need for the respective application, particularly if no alternatives exist. Such an upper limit may be in the order of 100, for example. The advantages of measuring arrangement 1 compared with conventional sequential systems become more and more pronounced as the number of transmission paths increases, and if a small number of transmission paths are used as the signal-to-noise ratio becomes smaller.

Figure 2:
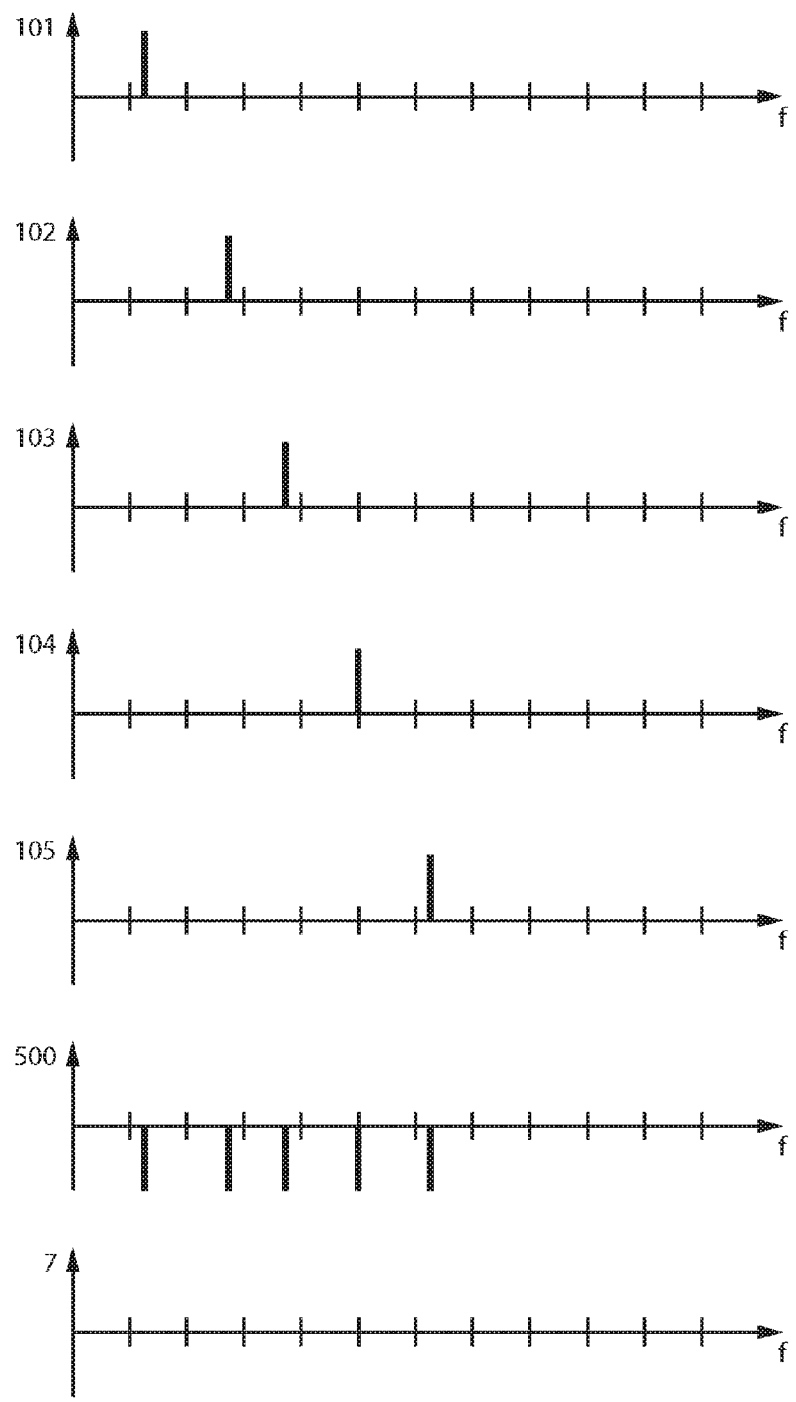
FIG. 2 shows the signal plots of the control signals for the light sources.

FIG. 2 shows the signal plots in the frequency range of the supply signals for transmission light sources 101, 102 and of the supply signal for compensation light source 500. In FIG. 2, it is assumed that five transmission paths are connected in parallel.

It may be seen clearly that the supply signals for individual transmission light sources 101 to 105 each have only one base frequency, whereas the signal for compensation light source 500 shows all the base frequencies of the five supply signals for the transmission light sources.

Figure 3:
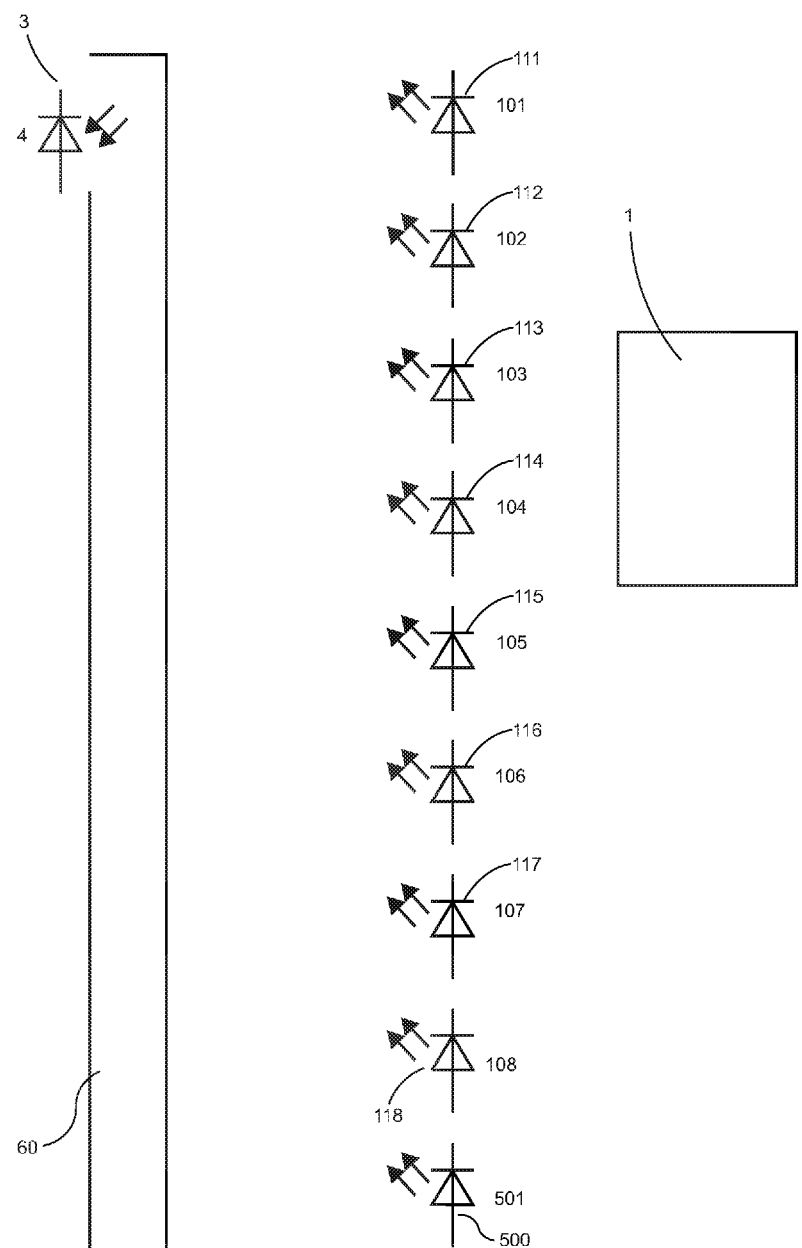
FIG. 3 shows an application example of the measuring arrangement of FIG. 1 in the form of a light curtain.

FIG. 3 shows a light curtain 20 that is constructing using a measuring arrangement 1 according to the principle of FIG. 1. In this case, eight transmission light sources 101 to 108, in the form of LEDs 111 to 118, are used for exemplary purposes. Photodiode 4 is located opposite these light sources and functions as the receiver 3. It is a part of receiver unit 2. It is possible to couple photodiode 4 to a receiving-light guide 60 that guided the light radiated by LEDs 111, . . . , 118 to photodiode 4. A compensation LED 501 is also positioned in addition to LEDs 101 to 118, and this serves as compensation light source 500. Compensation LED 501 is preferably positioned such that the optical coupling thereof with photodiode 4 has direct effect and consequently does not scan the spatial volume that is to be monitored. It is particularly preferred to position compensation LED 501 directly beside photodiode 4 or to couple compensation LED 501 to a receiving-light guide 60 in such manner that photodiode 4, which is also coupled thereto, is illuminated suitably.

With this light curtain 20, it is also possible to detect multiple objects, small compared with the total size of the curtain, passing through in quick succession and in different places, since all eight measurement paths formed are processed and evaluated in parallel.

Figure 4:
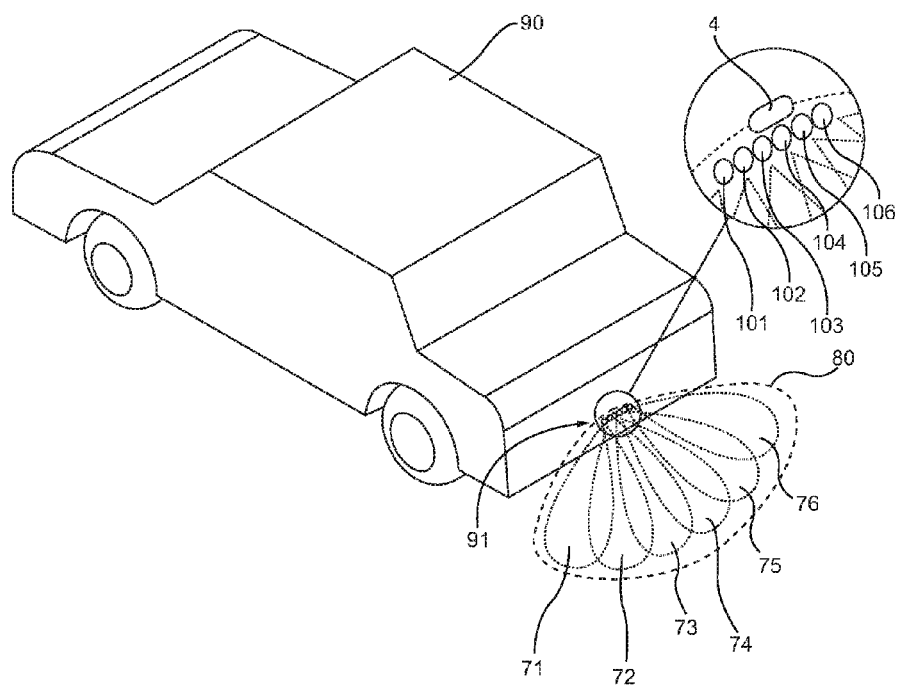
FIG. 4 shows a further application example of the measuring arrangement as an obstacle recognition unit.

FIG. 4 shows a vehicle 90 with an obstacle detection unit 91 that is constructed from the optoelectronic measuring arrangement according to the invention. A photodiode 4 and underneath it six transmission light sources 101, . . . , 106 constituting obstacle detection unit 91 are positioned close to the vehicle's 90 bumper. Compensation light source 500 is also present, but it is not shown in FIG. 4 because it is disposed under the cover in photodiode 4, which is a part of receiver unit 2, which is also not shown.

Transmission light sources 101, . . . , 106 each emit a light beam 71, 72, . . . , 76 and these beams together form a total light beam 80. At the same time, this light beam 80 also represents the monitoring area of obstacle detection unit 91. It has been found that by aligning the outer light sources 101 and 106 in particular, it is possible to illuminate a region of almost 180 degrees behind the vehicle. In this way, it is possible to monitor the entire area behind the vehicle with just one very compact measuring arrangement.

Of course it is also possible to use more than six transmission light sources 101, 102, . . . , 106 to cover an area without any gaps between the individual light beams 71, 72, . . . , 76.

The compact construction of obstacle detection unit 91 has the advantage that the required installation space in vehicle 90 is small. Thus the optical appearance of the vehicle is not spoiled, particularly because the measuring arrangement may also be mounted invisibly behind the bumper. The bumper material merely has to be partly or entirely permeable to the electromagnetic radiation (for example infrared radiation) emitted by light sources 101, 102, . . . , 106. Besides these optical advantages and the low price of obstacle detection unit 91, it also provides very good resolution not only at longer distances, in the 1 to 2 meter range, but also at smaller distances (near field). Moreover, the simultaneous processing of all transmission paths results in a rapid reaction time and thus also a reliably functioning system.

What is claimed is:

1. An optoelectronic measuring arrangement comprising
   at least two transmission light sources comprising a first transmission light source and a second transmission light source,
   a compensation light source that radiates light,
   a receiver unit with a receiver for receiving the light radiated by the transmission light sources and the compensation light source, wherein the receiver unit is configured to convert the light radiated by the transmission light sources and the compensation light source into an electrical receiving signal,
   at least two evaluation units for evaluating the electrical receiving signal, the evaluation units comprising a first evaluation unit and a second evaluation unit, wherein the first evaluation unit is configured to generate a first control signal, wherein the second evaluation unit is configured to generate a second control signal,
   at least two transmission paths comprising a first transmission path and a second transmission path, wherein the first transmission path comprises the first transmission light source, the first evaluation unit and a first clock generator, wherein the first clock generator generates a first clock for the first evaluation unit of the first transmission path, wherein the second transmission path comprises the second transmission light source, the second evaluation unit and a second clock generator, wherein the second clock generator generates a second clock for the second evaluation unit of the second transmission path, a control unit that generates a compensation control signal from the first and second control signals generated by the first and second evaluation units, the compensation light source being controlled and supplied by the compensation control signal, and wherein the first evaluation unit of the first transmission path generates a first clock-synchronous control signal for the first transmission light source of the first transmission path from the electrical receiving signal.

2. The optoelectronic measuring arrangement according to claim 1, characterized in that the first evaluation unit of the first transmission path generates the first clock-synchronous control signal from the electrical receiving signal to compensate clock synchronous alternating light components in the electrical receiving signal.

3. The optoelectronic measuring arrangement according to claim 1, characterized in that the control unit comprises an adder.

4. The optoelectronic measuring arrangement according to claim 1, characterized in that the compensation control signal contains frequency components of the first and second control signals of the first and second evaluation units.

5. The optoelectronic measuring arrangement according to claim 1, characterized in that the first and second evaluation units respectively control the first and second transmission light sources in a clock-synchronous manner.

6. The optoelectronic measuring arrangement according to claim 1, characterized in that clock frequencies for controlling the first and second transmission light sources differ from each other by a frequency difference.

7. The optoelectronic measuring arrangement according to claim 6, characterized in that the frequency difference is at least 1 kHz.

8. The optoelectronic measuring arrangement according to claim 6, characterized in that the frequency difference is at least 2 kHz.

9. The optoelectronic measuring arrangement according to claim 6, characterized in that the frequency difference is not more than 10 kHz.

10. The optoelectronic measuring arrangement according to claim 1, characterized in that clock frequencies for controlling the first and second transmission light sources are at least 1 kHz.

11. The optoelectronic measuring arrangement according to claim 1, characterized in that clock frequencies for controlling the first and second transmission light sources are at least 10 kHz.

12. The optoelectronic measuring arrangement according to claim 1, characterized in that clock frequencies for controlling the first and second transmission light sources are at least 100 kHz.

13. The optoelectronic measuring arrangement according to claim 1, characterized in that the compensation control signal includes the first and second control signals of the first and second evaluation units that are phase-shifted by 180°.

14. A method for simultaneous evaluation of a plurality of optical transmission paths using an optoelectronic measuring arrangement with extraneous light compensation, wherein the measuring arrangement comprises at least two transmission light sources comprising a first transmission light source and a second transmission light source, a compensation light source that is controlled independently of the transmission light sources, wherein the compensation light source emits a compensation light, a receiver, at least two evaluation units comprising a first evaluation unit and a second evaluation unit, and a control unit, comprising the following steps:

receiving the light radiated by the transmission light sources and the compensation light source with the receiver, wherein the light includes an alternating light component, converting the alternating light component into an electrical receiving signal, feeding the electrical receiving signal to the first and second evaluation units, performing clock-synchronous, frequency-selective evaluation of the electrical receiving signal and generating a first control signal with a first preset frequency with the first evaluation unit, performing clock-synchronous, frequency-selective evaluation of the electrical receiving signal and generating a second control signal with a second preset frequency with the second evaluation unit, feeding the first control signal to the first transmission light source, feeding the second control signal to the second transmission light source, inverting the first control signal to create a first inverted control signal and feeding the first inverted control signal to the control unit, inverting the second control signal to create a second inverted control signal and feeding the second inverted control signal to the control unit, merging with the control unit the first and second inverted control signals of the first and second evaluation units to form a compensation control signal that includes the frequency components of the first and second control signals, and supplying the compensation light source with the compensation control signal.

\* \* \* \* \*